United States Patent
Kim et al.

(10) Patent No.: US 12,380,231 B2
(45) Date of Patent: Aug. 5, 2025

(54) METHOD OF PROCESSING SECURE DATA AND ELECTRONIC DEVICE SUPPORTING THE SAME

(71) Applicant: Samsung Electronics Co., Ltd., Gyeonggi-do (KR)

(72) Inventors: Jinhyoung Kim, Gyeonggi-do (KR); Sunjune Kong, Gyeonggi-do (KR); Bumhan Kim, Gyeonggi-do (KR); Taehoon Kim, Gyeonggi-do (KR)

(73) Assignee: Samsung Electronic Co., Ltd, Suwon-si (KR)

( * ) Notice: Subject to any disclaimer, the term of this patent is extended or adjusted under 35 U.S.C. 154(b) by 159 days.

(21) Appl. No.: 17/940,214

(22) Filed: Sep. 8, 2022

(65) Prior Publication Data

US 2023/0004660 A1    Jan. 5, 2023

Related U.S. Application Data

(63) Continuation of application No. PCT/KR2021/020162, filed on Dec. 29, 2021.

(30) Foreign Application Priority Data

Dec. 29, 2020  (KR) ........................ 10-2020-0186491

(51) Int. Cl.
*G06F 21/60* (2013.01)
*G06F 21/31* (2013.01)
(Continued)

(52) U.S. Cl.
CPC ............ *G06F 21/604* (2013.01); *G06F 21/31* (2013.01); *G06F 21/62* (2013.01); *H04L 9/3213* (2013.01)

(58) Field of Classification Search
CPC ........ G06F 21/604; G06F 21/31; G06F 21/62; G06F 21/53; G06F 2221/2141; H04L 9/3213; H04L 9/0894; H04L 9/3297
See application file for complete search history.

(56) References Cited

U.S. PATENT DOCUMENTS 8,332,653 B2    12/2012  Buer
9,756,048 B2 *   9/2017  Kiperberg ........... G06F 12/1408
(Continued)

FOREIGN PATENT DOCUMENTS

JP      2013-239036 A    11/2013
KR   10-2016-0017583 A    2/2016
(Continued)

OTHER PUBLICATIONS

Trusted Execution Environment: What It Is, and What It Is Not; 2015 IEEE Trustcom/BigDataSE/ISPA; Mohamed Sabt, Mohammed Achemlal, and Abdelmadjid Bouabdallah; 2015.*
(Continued)

*Primary Examiner* — Sm A Rahman
(74) *Attorney, Agent, or Firm* — Cha & Reiter, LLC

(57) ABSTRACT

According to certain embodiments, an electronic device comprises: a memory storing an interface and an application; a processor; and a secure module physically separated from the processor and including a secure processor and a secure memory, wherein the processor is configured to: obtain user authentication information, through the interface; attempt user authentication, based on the user authentication information; obtain data stored in the secure memory when the user authentication succeeds; store a first token including a first valid duration for an access to the secure memory, the obtained data, and a first key value for (Continued)

decoding the obtained data in a buffer; and delete the first token and the first key value from the buffer when the first valid duration expires.

15 Claims, 10 Drawing Sheets

(51) Int. Cl.
 *G06F 21/62* (2013.01)
 *H04L 9/32* (2006.01)

(56) References Cited

U.S. PATENT DOCUMENTS

| | | | |
|---|---|---|---|
| 11,010,310 B2* | 5/2021 | Durham | G06F 21/64 |
| 2014/0020114 A1 | 1/2014 | Bhatia et al. | |
| 2016/0110414 A1 | 4/2016 | Park et al. | |
| 2016/0117683 A1 | 4/2016 | Jung et al. | |
| 2016/0134623 A1* | 5/2016 | Roth | H04L 63/0823 713/156 |
| 2019/0114428 A1 | 4/2019 | Kim et al. | |
| 2019/0171829 A1* | 6/2019 | Tackabury | G06F 21/6209 |
| 2021/0271743 A1 | 9/2021 | Jung et al. | |

FOREIGN PATENT DOCUMENTS

| | | | | |
|---|---|---|---|---|
| KR | 10-2016-0046545 A | | 4/2016 | |
| KR | 20160046545 A | * | 4/2016 | G06F 12/0862 |
| KR | 10-2016-0049802 A | | 5/2016 | |
| KR | 10-1629740 B1 | | 6/2016 | |
| KR | 101665670 B1 | * | 10/2016 | G06F 21/45 |
| KR | 10-2017-0030408 A | | 3/2017 | |
| KR | 10-2020-0011328 A | | 2/2020 | |

OTHER PUBLICATIONS

Korean Office Action dated May 2, 2025.

* cited by examiner

METHOD OF PROCESSING SECURE DATA AND ELECTRONIC DEVICE SUPPORTING THE SAME

CROSS-REFERENCE TO RELATED APPLICATION(S)

This application is a continuation of International Application No. PCT/KR2021/020162, filed on Dec. 29, 2021, which claims priority to Korean Patent Application No. 10-2020-0186491, filed on Dec. 29, 2020 in the Korean Intellectual Property Office, the disclosures of which are herein incorporated by reference.

TECHNICAL FIELD

Certain embodiments of the disclosure relate to a method of processing secure data, and an electronic device supporting the method.

BACKGROUND

An electronic device may provide various functions. For example, the electronic device may provide telephony, camera capture, web search, biometric authentication, block chain, or payment functions. Among the aforementioned functions, there are functions requiring a high level of security. These functions can include, such as biometric authentication, block chain, or payment, the electronic device may control an access to secure data such as exemplars for biometric authentication, passwords, account information. For example, the electronic device may be equipped with a secure hardware (or a secure module) physically separated and store the secure data in a secure memory (e.g., a secure non-volatile memory (NVM)).

However, the legacy secure hardware may only perform an operation according to a service request. Legacy hardware might not provide an access control with user authentication. Accordingly, the legacy electronic device may optionally permit an access to secure data stored in a secure memory. The access might be permitted without a separate access control through a Trusted Application (TA) operating in a secure environment (e.g., a Trusted Execution Environment (TEE)) of a processor such as a trust zone. User information may be leaked even in a state where a user does not use an electronic device (e.g., a lock state) since the access to the secure data may also be permitted.

SUMMARY

According to certain embodiments, an electronic device comprises: a memory storing an interface and an application; a processor; and a secure module physically separated from the processor and including a secure processor and a secure memory, wherein the processor is configured to: obtain user authentication information, through the interface; attempt user authentication, based on the user authentication information; obtain data stored in the secure memory when the user authentication succeeds; store a first token including a first valid duration for an access to the secure memory, the obtained data, and a first key value for decoding the obtained data in a buffer; and delete the first token and the first key value from the buffer when the first valid duration expires.

According to certain embodiments, an electronic device comprises: a memory storing an application; a processor; and a secure module physically separated from the processor and including a secure memory and a secure processor, wherein the secure processor is configured to: receive a signal requesting data stored in the secure memory from the processor; attempt user authentication, in response to receiving of the signal; verify a valid duration for an access to the secure memory when the user authentication succeeds; send a signal declining a request for the data to the processor when the valid duration is not verified; and transfer the data stored in the secure memory to the processor when the valid duration is verified.

According to certain embodiments, a method of processing secure data of an electronic device, comprises: obtaining user authentication information; attempting the user authentication, based on the user authentication information; obtaining the secure data from a secure memory included in a secure module physically separated from a processor of the electronic device, when the user authentication succeeds; storing a first token including a first valid duration for an access to the secure memory, the obtained secure data, and a first key value for decoding the obtained secure data in a buffer; and deleting the first token and the first key value from the buffer when the first valid duration expires.

Certain embodiments of the disclosure may provide a method of processing secure data which controls an access to a secure memory through an access control function associated with user authentication, and an electronic device supporting the method.

According to certain embodiments of the disclosure, an access to a secure memory may be controlled to increase security of secure data.

In addition thereto, various effects which are directly or indirectly understood through the disclosure may be provided.

DETAILED DESCRIPTION

Figure 1:
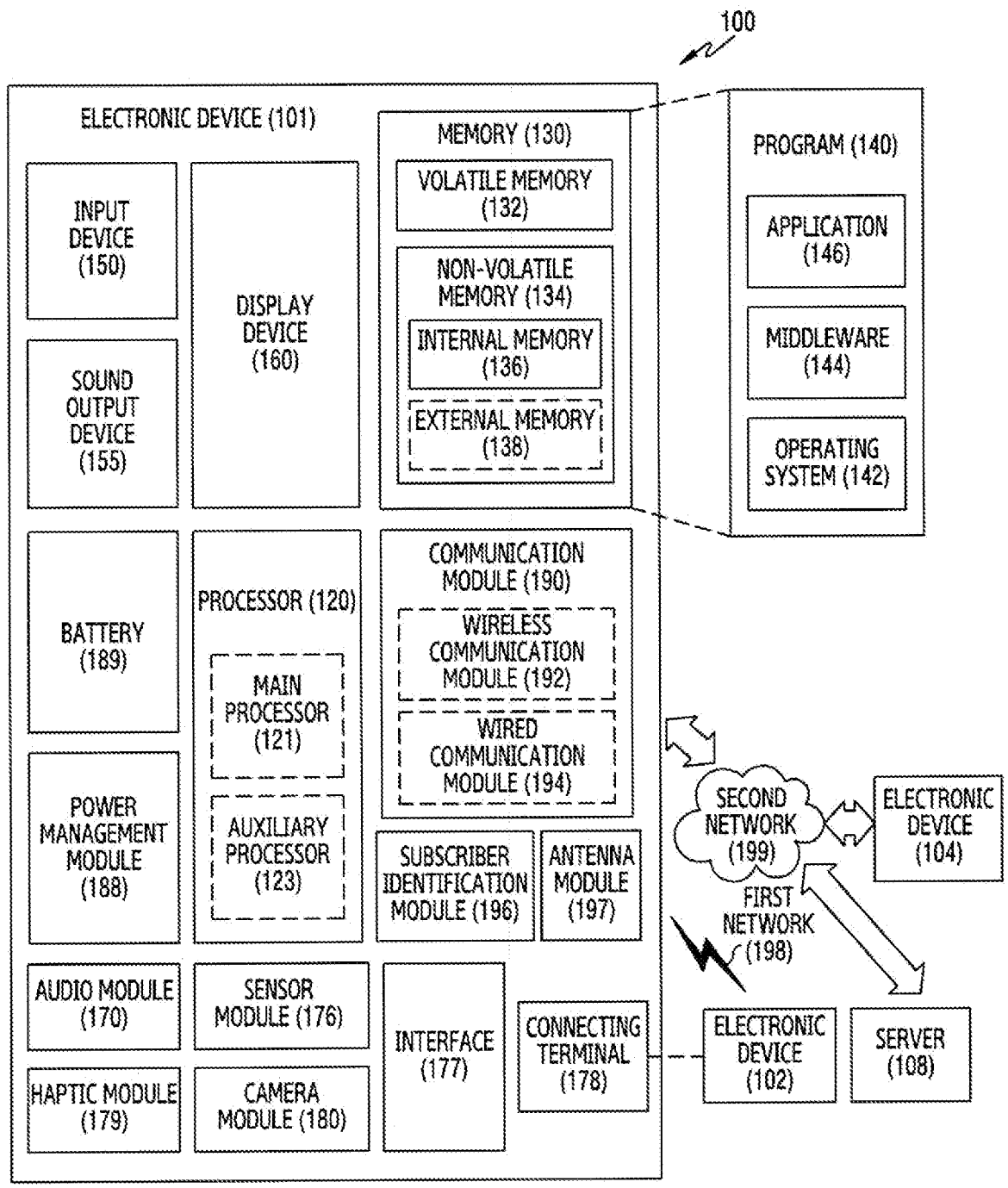
FIG. 1 is a block diagram of an electronic device in a network environment according to certain embodiments.

Hereinafter, certain embodiments of the disclosure will be described in detail with reference to the accompanying drawings. Components shown in the drawings may be exaggerated or reduced in size for convenience of explanation, and the disclosure is not necessarily limited thereto.

FIG. 1 is a block diagram of an electronic device 101 where certain embodiments of the disclosure can be practiced. The electronic device 101 may include memory 130 that stores sensitive information. The sensitive information, may include, but is not limited to, passwords, financial accounts, biometric information, and medical information.

Electronic Device

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The term "processor" shall be understood to refer to both the singular and plural context in this document.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory includes internal memory 136 and external memory 138. The external memory 138 can be, for example, a memory card with Flash ROM.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

The antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device 101 can also include a secure module 199. The secure module 199 can be physically separated from processor 120 and can include a secure processor and a secure memory.

As noted, the memory 130 can store sensitive information. As will be described below, the electronic device 101 may restrict access to the sensitive information.

Secure Access

Figure 2:
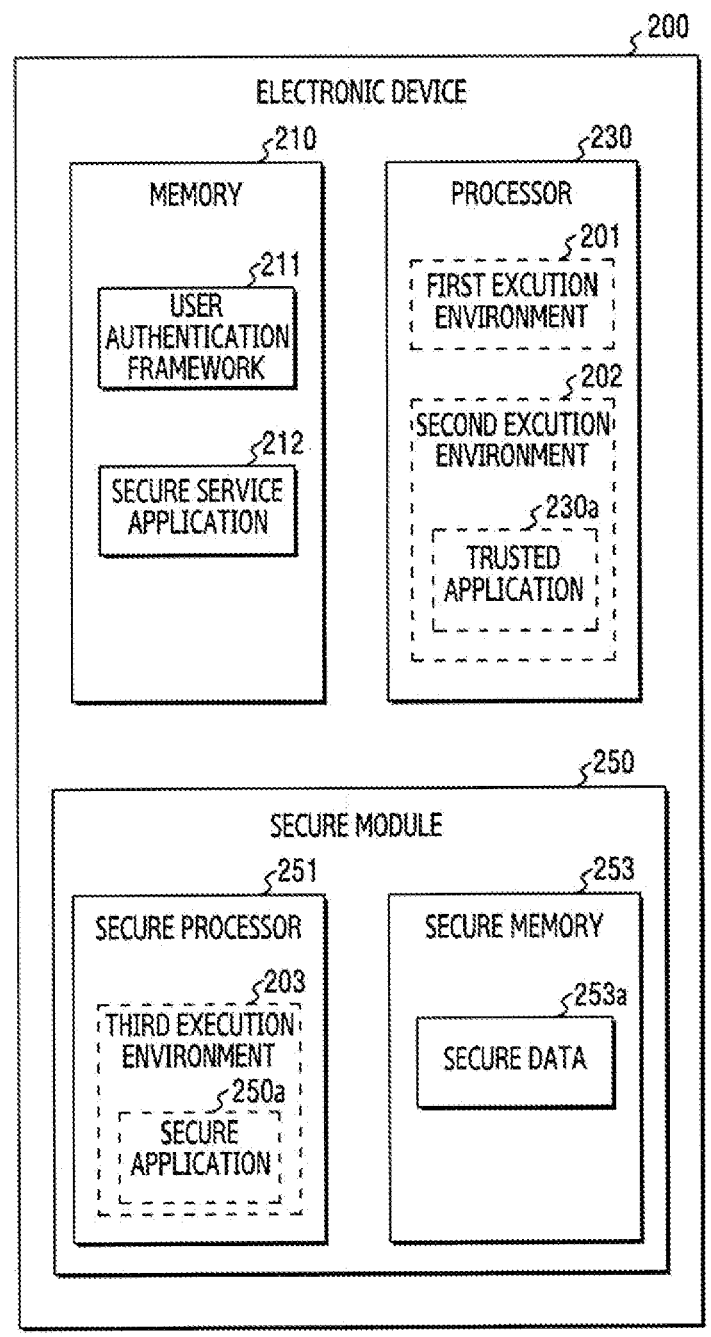
FIG. 2 is a drawing illustrating a structure of an electronic device related to processing of secure data according to an embodiment of the disclosure.

FIG. 2 is a drawing illustrating a structure of an electronic device related to processing of secure data according to an embodiment of the disclosure. The electronic device includes processor 230, memory 210, and a secure module 250. The secure module 250 includes a secure processor 251 and a secure memory 253.

When using sensitive data, such as biometric authentication, block chain, or payment, an electronic device 200 (e.g., the electronic device 101 of FIG. 1) may store the sensitive data as secure data 253a in the secure memory 253 and control access to the secure memory 253. For example, the electronic device 200 may include a physically separated secure module (or secure hardware) 250, and that stores the secure data 253a in the secure memory 253 included in the secure module 250, thereby improving security of the secure data 253a.

In addition, in order to prevent a Trusted Application (TA) 230a operating in a secure environment (or secure area) (e.g., Trusted Execution Environment (TEE)) from using the secure data 253a stored in the secure memory 253 without a separate access control, the electronic device 200 restrict access to the secure data 253a with requiring user authentication. For example, the electronic device 200 may restrict an access to the secure data 253a in a locked state or after a specified amount of time elapses after the user authentication (e.g., a state where a valid duration for the access to the secure memory 253 expires).

Referring to FIG. 2, the electronic device 200 for supporting the aforementioned function may include a memory 210 (e.g., the memory 130 of FIG. 1), a processor 230 (e.g., the processor 120 of FIG. 1), and the secure module 250. However, the structure of the electronic device 200 is not limited thereto. According to certain embodiments, the electronic device 200 may include at least one different component other than the aforementioned components. For example, the electronic device 200 may further include a display (e.g., the display module 160 of FIG. 1) for displaying a visual object. For example, the display may display a variety of content (e.g., a text, an image, a video, an icon, a symbol, etc.) to the user. The display may include a touch screen, and may receive, for example, a touch, gesture, proximity, or hovering input using an electronic pen or a user's body part. According to an embodiment, the display may output a user interface for the secure data 253a.

The memory 210 may store a variety of data used by at least one component of the electronic device 200. The memory 210 may store instructions and data related to processing of the secure data 253a. In this case, the instruction may be executed by the processor 230. The memory 210 may store a program or interface. The program may be capable of performing at least one function. For example, the memory 210 may store a user authentication framework 211 that includes and provide an user authentication interface and an application. The application may include a secure service application 212. The secure service application 212 may provide a service through a secure function. For example, the user authentication framework 211 may include an interface for switching the electronic device 200 from a lock state to an unlock state. The interface for switching to the unlock state may include, for example, an object which allows the user to input a pin number, a pattern, or a password. The secure service application 212 may include an application (e.g., a bank application or a payment application) providing a service by using the secure data 253a requiring processing with a high level security, such as biometric authentication, block chain, or payment.

The processor 230 may control at least one component of the electronic device 200, and may perform a variety of data processing or computation. The processor 230 may execute instructions stored in the memory 210 to perform a function related to processing or access of the secure data 253a. The processor 230 may perform a function related to processing of the secure data 253a through communication with a secure processor 251 included in the secure module 250.

The processor 230 may process normal data or may process data requiring secure access. A security level of data processed in the processor 230 may be lower than the security level of data processed in the secure module 250. The processor 230 may provide a first execution environment 201 (or, a normal area or a normal world, e.g., a Rich Execution Environment (REE)) for processing normal data and a second execution environment 202 (or, a secure area or a secure world, e.g., a Trusted Execution Environment (TEE)) for processing data with a lower security level than the security level of data processed in the secure module 250 and higher than a normal security level. For example, the user authentication framework 211 and the secure service application 212 may operate in the first execution environment 201, and the TA 230a may operate in the second execution environment 202. The TA 230a may include at least one of a user authentication processing application 231, secure processing application 232, and access processing application 233 disclosed in FIG. 3 to FIG. 8. Functions and operations of the user authentication processing application 231, the secure processing application 232, and the access processing application 233 will be described in detail with reference to FIG. 3 to FIG. 8.

The processor 230 may obtain user authentication information through the interface included in the user authentication framework 211. The processor 230 may attempt the user authentication, based on the obtained user authentication information. For example, when the user inputs a pin number, a pattern, or a password through the interface, the processor 230 may obtain the foregoing information (e.g., the pin number, the pattern, or the password) and use it to verify whether the user is an authorized user (a user who is allowed to use the electronic device 200) (i.e., user authentication). For example, the user authentication may be attempted through the user authentication processing application 231.

When the user authentication fails, the processor 230 may output information for notifying that the user authentication has failed, through an interface provided by the user authentication framework 211. For example, the processor 230 may display an object indicating the failure of the user authentication on the display.

When the user authentication succeeds, the processor 230 may obtain the secure data 253a from the secure memory 253 included in the secure module 250. In addition, the processor 230 may store a token including a valid duration for an access to the secure memory 253, the secure data 253a obtained from the secure memory 253, and a key value for decoding the obtained secure data 253a in a buffer. Herein, the buffer may be included in the second execution environment 202. For example, the token may include at least one of a User Identifier (UID), an authentication time, a valid duration, and signature information. The processor 230 may store at least one of the token, the obtained secure data 253a, and the key value through the TA 230a (e.g., the access processing application 233) operating in the second execution environment 202.

In certain embodiments, the secure data 253a stored in the buffer may be encoded (or encrypted) according to the key value, wherein the key value is needed for decoding (or decryption).

When at least one of the token, the obtained secure data 253a, and the key value is stored in the buffer and the time is within the valid duration in the token, when the secure service application 212 requests the secure data 253a, the processor 230 may transfer the secure data 253a from the buffer to the secure service application 212, instead of obtaining the secure data 253a from the secure memory 253.

Accordingly, the electronic device 200 restricts access as well as provides a fast response time, even in an environment of a low data transfer rate. This would occur without being limited to a hardware specification of the secure memory 253. In addition, since the electronic device 200 stores the secure data 253a in the buffer, advantageously, an access to the secure data 253a may be controlled at a security level higher than that of the first execution environment 201.

When the valid duration included in the token expires (when the time of attempted access is more than the valid duration after the time of last user authentication), the processor 230 may delete (or initialize) the token and key value from the buffer. For example, the processor 230 may control the access to the secure data 253a through the valid duration included in the token. In this case, when the valid duration expires, the token may be deleted (or initialized), so that validity for the access to the secure data 253 is determined rapidly by verifying only whether the token is present (or whether it is initialized). That is, in a state where the user does not use the electronic device 200 before the user authentication (e.g., a lock state) or a state where a specified time elapses after the user authentication (e.g., a state where the valid duration expires), the processor 230 may not transfer the secure data 253a stored in the buffer to the secure service application 212.

The term "deleted" may be understood to include both the circumstance where the deleted item is actually overwritten in memory as well as when the memory locations storing the item are deemed available for writing, even though they may still store the item. In certain embodiments, when the valid duration expires, the token and key value may be overwritten.

When a signal requesting the secure data 253a is obtained by the execution of the secure service application 212, the processor 230 may verify whether the token stored in the buffer is present. When there is no token stored in the buffer, the processor 230 may send a signal declining the request for the secure data to the secure service application 212. Alternatively, the processor 230 may verify that the valid duration included in the token when the first token is present in the buffer. When the valid duration has not expired, the processor 230 may decode the secure data 253a stored in the buffer using the key value, and transfer the decoded secure data 253a to the secure service application 212.

After the token and the key value are deleted from the buffer, the processor 230 may obtain user authentication information (e.g., a pin number, a pattern, or a password) through the interface. The processor 230 may attempt user authentication, based on the obtained user authentication information. In addition, when the user authentication succeeds, another token including another valid duration reconfigured for an access to the secure memory 253 and a key value for decoding the secure data 253*a* stored in the buffer may be stored in the buffer.

For example, after the secure data 253*a* is obtained from the secure memory 253 and is stored in the buffer, when the token and the key value are deleted at the expiry of the valid duration the processor 230, the processor 230 may store the token including the key value again in the buffer. The token may include a reconfigured valid duration. In this case, the processor 230 may skip the operation of obtaining the secure data 253*a* from the secure memory 253.

When a signal requesting to write data (e.g., the secure data 253*a*) in the secure memory 253 is obtained by the execution of the secure service application 212, the processor 230 may verify whether the token stored in the buffer is present. When the buffer does not store the token, the processor 230 may send a signal declining to write the data to the secure service application 212. Alternatively, the processor 230 may verify the valid duration included in the token when the first token is present in the buffer, write the data in the buffer when the valid duration is verified. The valid duration can be verified by verifying that the current time is within the valid duration from the most recent user authentication. In addition, the processor 230 may transfer the data stored in the buffer to the secure data 253*a* so that the data is stored in the secure memory 253.

The secure module 250 may include the secure processor 251 and the secure memory 253 which stores the secure data 253*a*, as secure hardware physically separated from the processor 230. The secure processor 251 may perform a function related to processing of the secure data 253*a* requiring a high level of security. The secure processor 251 may perform a function related to processing of the secure data 253*a* through communication with the processor 230.

The secure processor 251 may provide a third execution environment 203 (e.g., a Secure Execution Environment (SEE)) for processing the secure data 253*a*. Since the third execution environment 203 is provided from the secure processor 251 that is physically separated from the processor 230, it is possible to provide a a higher security level than the second execution environment 202. The secure memory 253 may be included in the third execution environment 203. In addition, at least part of the function for processing the secure data 253*a* may be performed through a Secure Application (SA) 250*a* which operates in the third execution environment 203. The SA 250*a* may include at least one of a user authentication application 255 and access control application 257 disclosed in FIG. 3 to FIG. 8. Functions and operations of the user authentication application 255 and access control application 257 will be described in detail with reference to FIG. 3 to FIG. 8.

When information (e.g., a pin number, a pattern, or a password) for the user authentication is obtained through an interface provided by the user authentication framework 211, the processor 230 may transfer the obtained information to the secure processor 251. The secure processor 251 which has received the information transferred from the processor 230 may perform user authentication by comparing user authentication information pre-stored in the secure memory 253 and the transferred information. When the user authentication succeeds (e.g., when a value indicating similarity between the user authentication information pre-stored in the secure memory 253 and the transferred information is greater than or equal to a specified level), the secure processor 251 may switch the state of the electronic device 200 to the unlock state. Alternatively, when the user authentication fails (e.g., when the value indicating the similarity between the user authentication information pre-stored in the memory 253 and the transferred information is less than the specified level), the state of the electronic device 200 may be maintained to the lock state.

The secure processor 251 may apply the state (e.g., the lock state or the unlock state) of the electronic device 200 to information (e.g., the state information 259*a* of FIG. 3 to FIG. 8) indicating the state of the electronic device 200, stored in the third execution environment 203. For example, the secure processor 251 may also store the information indicating the state of the electronic device 200 as information indicating the lock state when the state of the electronic device 200 is the lock state, and may also store the information indicating the state of the electronic device 200 as information indicating the unlock state when the state of the electronic device 200 is the unlock state.

The secure processor 251 may receive from the processor 230 a signal requesting the secure data 253*a* stored in the secure memory 253. In addition, the secure processor 251 may attempt user authentication, in response to the signal received from the processor 230. The secure processor 251 may perform the user authentication, based on the information (e.g., the state information 259*a* of FIG. 3 to FIG. 8) indicating the state of the electronic device 200, stored in the third execution environment 203. When the electronic device 200 is the lock state, the secure processor 251 may process the user authentication as a failure, based on the information. Alternatively, when the state of the electronic device 200 is the unlock state, the secure processor 251 may process the user authentication as a success, based on the information.

The secure processor 251 may send a signal indicating a failure of the user authentication to the processor 230 when the user authentication fails, and may send a signal indicating a success of the user authentication to the processor 230 when the user authentication succeeds.

When the user authentication succeeds, the secure processor 251 may configure information (e.g., the valid duration 259*b* of FIG. 3 to FIG. 8) indicating a valid duration for an access to the secure memory 253, stored in the third execution environment 203. The information indicating the valid duration for the access to the secure memory 253 may include information on a time (e.g., a start time and an end (expiry) time) for which the access to the secure memory 253 is allowed. A secure timer for verifying the expiration of the valid duration for the access to the secure memory 253 may be included in the third execution environment 203. For example, as a timer which is set from the start time to the end (expiry) time, the secure timer may notify the expiration of the valid duration to the secure processor 251 when it is the end (expiry) time.

Information (e.g., the state information 259*a* oaf FIG. 3 to FIG. 8) indicating the state of the electronic device 200 and information (e.g., the valid duration 259*b* of FIG. 3 to FIG. 8) indicating the valid duration for the access to the secure memory 253 may be stored in a form of a slot in the third execution environment 203. For example, the secure memory 253 may distinguish a slot accessible by each SA 250*a* by dividing a storage area on a slot basis. In addition, the secure data 253*a* may also be stored in the form of the slot. For example, the secure memory 253 may be divided into a slot for storing information (e.g., a pin number, a pattern, or a password) related to user authentication and a slot for storing data used by the secure service application 121, and the secure data 253*a* may be stored in the divided slot according to a type of the secure data 253*a*.

According to an embodiment, in response to the signal requesting the secure data 253a from the processor 230, when the user authentication succeeds as a result of performing user authentication, the secure processor 251 may verify the valid duration (e.g., the valid duration 259b of FIG. 3 to FIG. 8) for the access to the secure memory 253. In addition, when the access to the secure memory 2553 is not valid as the result of verifying the valid duration, the processor 251 may send a signal declining the request for the secure data 253a to the processor 230. Alternatively, when the access to the secure memory 253 is valid as the result of verifying the valid duration, the secure processor 251 may send the secure data 253a stored in the secure memory 253 to the processor 230. The secure processor 251 may perform an operation of performing the user authentication and an operation of verifying the valid duration, through the SA 250a (e.g., the user authentication application 255 and the access control application 257) which operates in the third execution environment 203.

As described above, according to certain embodiments, an electronic device (e.g., the electronic device 200) may include a memory (e.g., the memory 210) which stores a framework (e.g., the user authentication framework 211) providing an interface for user authentication and an application (e.g., the secure service application 212) providing a service through a secure function, a processor (e.g., the processor 230), and a secure module (e.g., the secure module 250) physically separated from the processor and including a secure memory (e.g., the secure memory 253) storing secure data and a secure processor (e.g., the secure processor 251). The processor may be configured to obtain information for the user authentication, through the interface, perform the user authentication, based on the obtained information, obtain the secure data from the secure memory when the user authentication succeeds, store a first token including a first valid duration for an access to the secure memory, the obtained secure data, and a first key value for decoding the obtained secure data in a buffer, and delete the first token and the first key value from the buffer when the first valid duration expires.

The processor may be configured to verify whether the first token is present in the buffer, upon receiving from the application a signal requesting the secure data, and send a signal declining the request for the secure data to the application when the first token is absent in the buffer.

The processor may be configured to verify the first valid duration included in the first token when the first token is present in the buffer, decode the secure data stored in the buffer using the first key value, when the first valid duration is verified, and send the decoded secure data to the application.

The processor may be configured to, after the first token and the first key value are deleted from the buffer, obtain user authentication information through the interface. The processor may be configured to perform user authentication, based on the obtained user authentication information, and store a second token including a second valid duration for an access to the secure memory and a second key value for decoding the secure data in the buffer, when the user authentication succeeds.

The processor may be configured to verify whether the first token is present in the buffer upon receiving from the application a signal requesting to store data in the secure memory, and send to the application a signal declining to store the data, when the first token is absent in the buffer.

The processor may be configured to verify the first valid duration included in the first token, when the first token is present in the buffer, write the data in the buffer, when the first valid duration is verified, and write the data stored in the buffer to the secure memory.

The buffer may be included in a Trusted Execution Environment (TEE) (e.g., the second execution environment 202) of a first security level provided by the processor. The secure memory may be included in a Secure Execution Environment (SEE) (e.g., the third execution environment 203) of a second security level higher than the first security level provided by the secure processor.

The first token, the obtained secure data, and the first key value may be stored in the buffer through a Trusted Application (TA) (e.g., the TA 230a) operating in the TEE.

An electronic device (e.g., the electronic device 200) may include a memory (e.g., the memory 210) stores an application (e.g., the secure service application 212), a processor (e.g., the processor 230), and a secure module (e.g., the secure module 250) physically separated from the processor. The secure module includes a secure memory (e.g., the secure memory 253) and a secure processor (e.g., the secure processor 251). The secure processor may be configured to receive a signal requesting data stored in the secure memory from the processor, attempt user authentication, in response to the receiving of the signal, verify a valid duration for an access to the secure memory when the user authentication succeeds, send a signal declining a request for the data to the processor when the valid duration is verified, and send the data stored in the secure memory to the processor when the valid duration is verified.

The processor may provide a TEE (e.g., the second execution environment 202) of a first security level. The secure memory may be included in an SEE (e.g., the third execution environment 203) of a second security level higher than the first security level provided by the secure processor.

The secure processor may be configured to perform the user authentication, based on information indicating a state of the electronic device, stored in the SEE.

The performing of the user authentication and the verifying of the valid duration may be performed through a Secure Application (SA) (e.g., the SA 250a) operating in the SEE.

As described above, the electronic device 200 including the secure module 250 physically separated from the processor 230 may provide a method of processing the secure data 253a through an SA (e.g., the SA 250a of FIG. 2 (operating in the third execution environment (e.g., the SEE) provided by the secure processor 251 included in the secure module 250 and a method of processing the secure data 253a through a TA (e.g., the TA 230a of FIG. 2) operating in the second execution environment (e.g., the TEE) provided by the processor 230. The method of processing the secure data 253a through the SA has an advantage in that secure processing of a high level is possible, compared to the method of processing the secure data 253a through the TA. The method of processing the secure data 253a through the TA has an advantage in that a service requirement in which a fast response time is desired even in an environment of a low data transfer rate is satisfied, without being limited to a hardware specification of the secure memory 253, compared to the method of processing the secure data 253a through the SA. The method of processing the secure data 253a through the SA is described below with reference to FIG. 3 to FIG. 5, and the method of processing the secure data 253a through the TA is described below with reference to FIG. 6 to FIG. 8 and FIG. 10.

Figure 3:
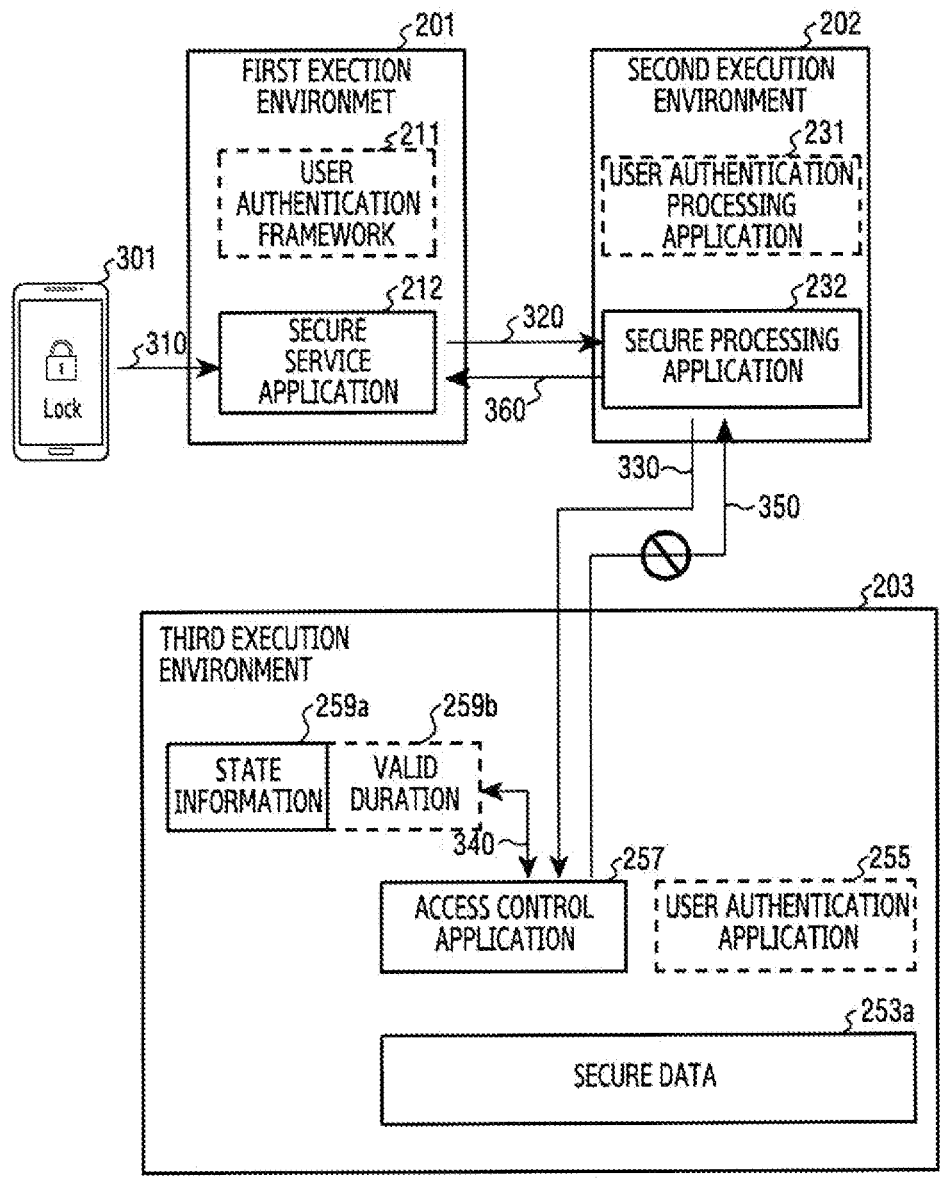
FIG. 3 is a drawing illustrating a method of processing secure data through a Secure Application (SA) before user authentication according to an embodiment of the disclosure.

FIG. 3 is a drawing illustrating a method of processing secure data through an SA before user authentication according to an embodiment of the disclosure.

Referring to FIG. 3, as shown in operation 310, in a state 301 before user authentication (e.g., a lock state), the electronic device 200 may execute the secure service application 212 which operates in the first execution environment 201. The execution of the secure service application 212 in the state 301 before user authentication may cause leakage of user's critical information due illegal use such as hacking without user's recognition. Accordingly, the electronic device 200 may increase security of the secure data 253a stored in the secure memory 253 through an access control function associated with the user authentication.

In operation 320, the secure service application 212 may send a first signal requesting the secure data 253a to the secure processing application 232 which operates in the second execution environment 202. Operations of the secure service application 212 and secure processing application 232 may be controlled by the processor 230.

The secure processing application 232 may transmit to the secure processor 251 which provides the third execution environment 203 a second signal (or request message) including at least one of a type of the request, a service identifier (e.g., a service name), slot information, a timestamp of the request, a random number, and credential information. The type of the request may include read, write, or delete of data. The read of the data may indicate that the secure data 253a stored in the secure memory 253 is requested. The write of the data may indicate that data is stored in the secure memory 253. The delete of the data may indicate that the secure data 253a stored in the secure memory 253 is delete. The service identifier may include information capable of identifying an owner of the requested secure data 253a. The slot information may include information indicating a location at which the secure data 253a is stored in the secure memory 253. The timestamp of the request may indicate a time at which the secure data 253a is requested. The random number may be associated with information for avoiding retransmission of the same second signal (or request message). For example, the random number may be used to avoid retransmission of the second signal (or request message). The credential information may include data (e.g., the secure data 253a) to be stored in the secure memory 253 when the type of the request is the write of the data. The secure processor 251 which has received the second signal (or request message) may transfer signature information for the second signal (or request message) to the secure processing application 232.

In operation 330, the secure processing application 232 which has received the signature information may send the second signal (or request message) and the signature information to the access control application 257 which operates in the third execution environment 203. Operations of the access control application 257 may be controlled by the secure processor 251.

In operation 340, the access control application 257 which has received the second signal (or request message) may perform user authentication, based on the state information 259a stored in the third execution environment 203. For example, the access control application 257 may verify the state of the electronic device 200, based on the state information 259a, and may determine whether the user authentication succeeds or fails according to the state of the electronic device 200. For example, when the state of the electronic device 200 is the lock state, the access control application 257 may process the user authentication as a failure. As another example, when the state of the electronic device 200 is the unlock state, the access control application 257 may process the user authentication as a success. Since the secure service application 212 is executed in the state 301 before user authentication in FIG. 3, the state of the electronic device 200 is the lock state. Therefore, the access control application 257 may process the user authentication as a failure.

The secure processor 251 and the secure memory 253 may share an authentication key for message authentication. The authentication key may be used for the purpose of verifying that the message is transmitted.

When the user authentication fails, as shown in operation 350, the access control application 257 may send a third signal (or decline message) indicating the failure of the user authentication to the secure processing application 232. In this case, the access control application 257 may not verify the valid duration 259b for the access to the secure memory 253.

In operation 360, the secure processing application 232 which has received the third signal (or decline message) indicating the failure of the user authentication may send to the secure service application 212 a fourth signal which notifies that the request for the secure data 253a is declined (or the user authentication fails). The secure service application 212 may output information indicating that the request for the secure data 253a is declined (or the user authentication fails) through an interface, in response to the fourth signal. For example, the secure service application 212 may display a visual object indicating that the request for the secure data 253a is declined (or the user authentication fails) on a display. As another example, the secure service application 212 may output a voice indicating that the request for the secure data 253a is declined (or the user authentication fails) through a speaker.

Figure 4:
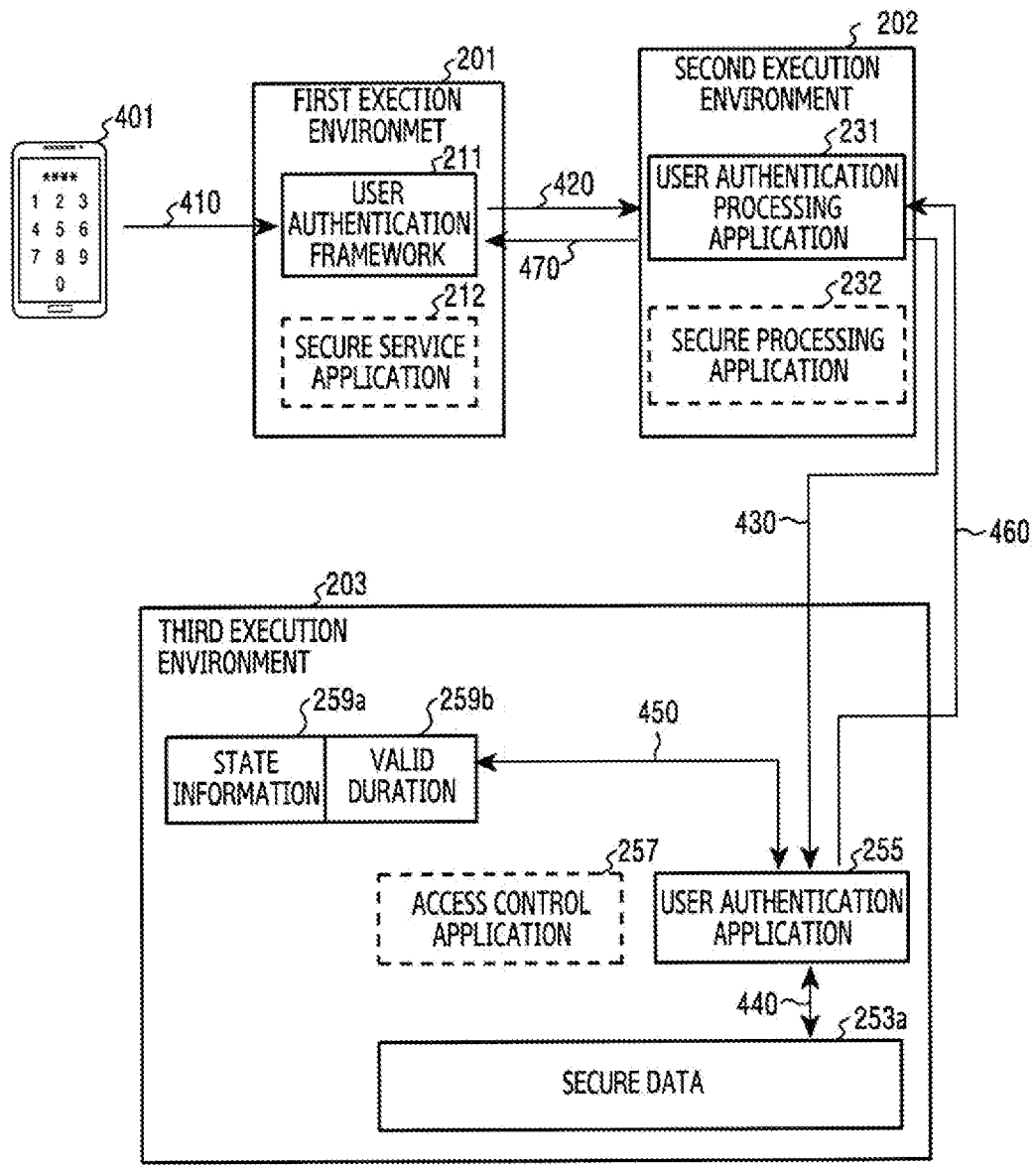
FIG. 4 is a drawing illustrating a method of user authentication through an SA according to an embodiment of the disclosure.

FIG. 4 is a drawing illustrating a method of user authentication through an SA according to an embodiment of the disclosure.

Referring to FIG. 4, as shown in operation 410, the electronic device 200 may provide an interface 401 so that user authentication information (e.g., a pin number, a pattern, or a password) is input through the first execution environment 201. In addition, the user authentication framework 211 may obtain information for the user authentication through the interface 401. For example, the interface 401 may be displayed on a display when the electronic device 200 is booted or in a state where a specified time elapses after user authentication (e.g., a state where a valid duration for an access to the secure memory 253 expires).

When the information for the user authentication is obtained, in operation 420, the user authentication framework 211 may send a first signal including the obtained information to the user authentication processing application 231 which operates in the second execution environment 202. The information for the user authentication may be transferred to the user authentication processing application 231 by being converted (e.g., encrypted) to a secure format. Operations of the user authentication framework 211 and user authentication processing application 231 may be controlled by the processor 230.

The user authentication processing application 231 may transmit to the secure processor 251 which provides the third execution environment 203 a second signal (or request message) requesting verification of information obtained for the user authentication. The second signal (or request message) may include at least one of a type of the request, a service identifier (e.g., a service name), slot information, a timestamp of the request, a random number, and encrypted user authentication information (e.g., information obtained by encrypting a pin number, a pattern, or a password). The type of the request may include information which requests verification of the user authentication information. The type of the request may include information indicating a type of the user authentication information. The service identifier may include information capable of identifying an owner of the user authentication information which requests the verification. The slot information may include information indicating a location at which pre-stored user authentication information is stored in the secure memory 253. The timestamp of the request may indicate a time at which verification of the user authentication information is requested. The random number may be associated with information for avoiding retransmission of the same second signal (or request message). For example, the random number may be used to avoid retransmission of the second signal (or request message). The secure processor 251 which has received the second signal (or request message) may transfer signature information for the second signal (or request message) to the user authentication processing application 231.

In operation 430, the user authentication processing application 231 which has received the signature information may send the second signal (or request message) and the signature information to the user authentication application 255 which operates in the third execution environment 203. Operations of the user authentication application 255 may be controlled by the secure processor 251.

In operation 440, the user authentication application 255 which has received the second signal (or request message) may attempt user authentication by comparing user authentication information (including the secure data 253a) pre-stored in the secure memory 253 and user authentication information received from the user authentication application 231.

When the user authentication succeeds (e.g., when a value indicating similarity between the user authentication information pre-stored in the secure memory 253 and the transferred information is greater than or equal to a specified level), the user authentication application 255 may switch the state of the electronic device 200 to the unlock state. Alternatively, when the user authentication fails (e.g., when the value indicating the similarity between the user authentication information pre-stored in the memory 253 and the transferred information is less than the specified level), the user authentication application 255 may maintain the state of the electronic device 200 to the lock state.

In operation 450, the user authentication application 255 may apply the state (e.g., the lock state or the unlock state) of the electronic device 200 to the state information 259a stored in the third execution environment 203. For example, the user authentication application 255 may also store the state information 259a as information indicating the lock state when the state of the electronic device 200 is the lock state, and may also the state information 259a as information indicating the unlock state when the state of the electronic device 200 is the unlock state. In addition, when the user authentication succeeds, in operation 450, the user authentication application 255 may configure a valid duration 259b for an access to the secure memory 253. For example, the user authentication application 255 may store a current time or a time at which verification of the user authentication information is requested in the valid duration 259b. As another example, the user authentication application 255 may set a start time in the valid duration 259b for the access to the secure memory 253 to the current time or the time at which verification of the user authentication information is requested, and may set an end (expiry) time in the valid duration 259b to a time which exceeds by a specified time from the start time. According to an embodiment, a secure timer for verifying the expiration of the valid duration 259b for the access to the secure memory 253 may be included in the third execution environment 203. For example, as a timer which is set from the start time to the end (expiry) time included in the valid duration 259b, the secure timer may notify the expiration of the valid duration 259b to the secure processor 251 when it is the end (expiry) time.

The secure processor 251 and the secure memory 253 may share an authentication key for message authentication. The authentication key may be used for the purpose of verifying that the message is transmitted.

In operation 460, the user authentication application 255 may send a third signal (or decline message) indicating a result of processing the user authentication to the user authentication processing application 231. In addition, in operation 470, the user authentication processing application 231 which has received the third signal (or result message) indicating the result of processing the user authentication may send a fourth signal including the result of processing the user authentication to the user authentication framework 211. The user authentication framework 211 may output information indicating the result of processing the user authentication through an interface, in response to the fourth signal. For example, the user authentication framework 211 may display a visual object indicating the result of processing the user authentication on the display. As another example, the user authentication framework 211 may output a voice indicating the result of processing the user authentication through a speaker.

Figure 5:
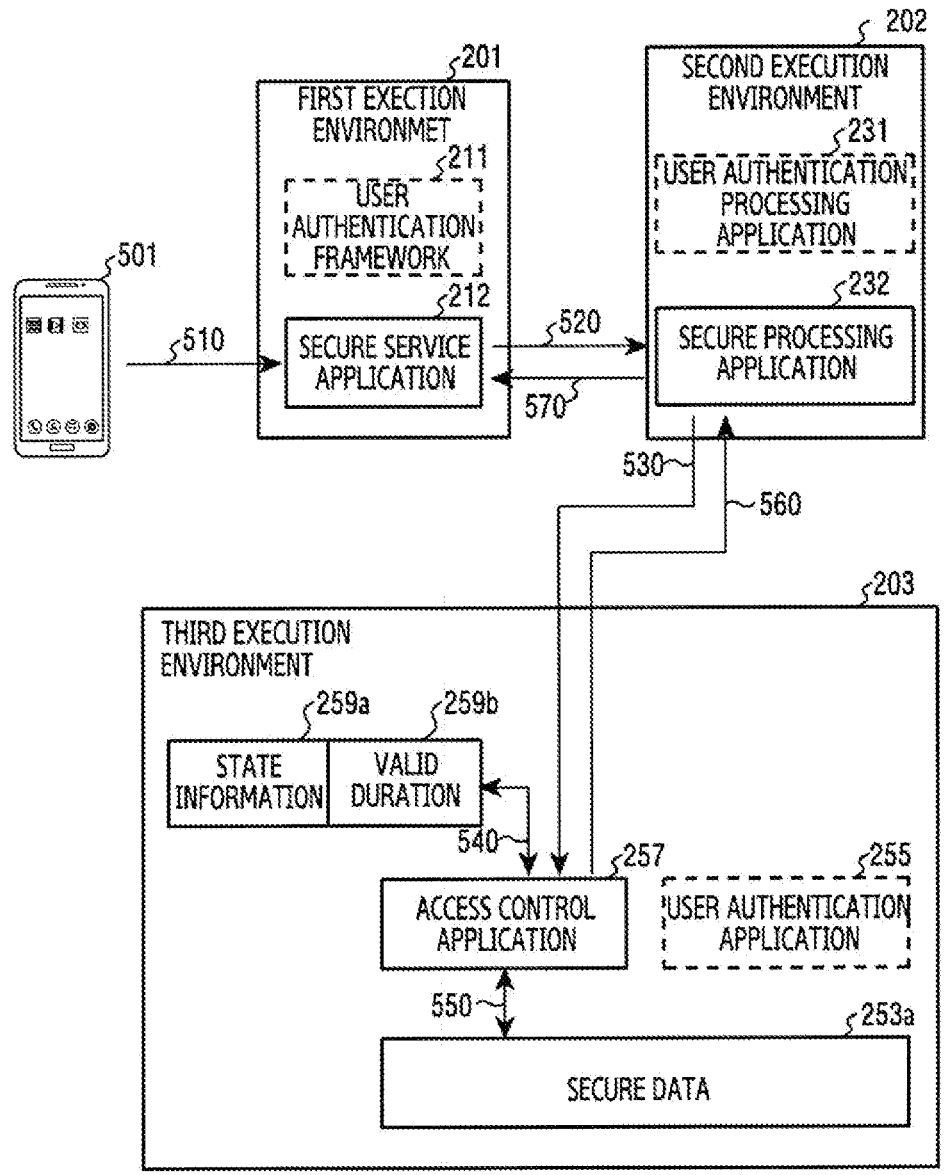
FIG. 5 is a drawing illustrating a method of processing secure data through an SA after user authentication according to an embodiment of the disclosure.

FIG. 5 is a drawing illustrating a method of processing secure data through an SA after user authentication according to an embodiment of the disclosure.

Referring to FIG. 5, as shown in operation 510, in a state 501 after user authentication (e.g., an unlock state), the electronic device 200 may execute the secure service application 212 which operates in the first execution environment 201.

In operation 520, the secure service application 212 may send a first signal requesting the secure data 253a to the secure processing application 232 which operates in the second execution environment 202. Operations of the secure service application 212 and secure processing application 232 may be controlled by the processor 230.

The secure processing application 232 may transmit to the secure processor 251 which provides the third execution environment 203 a second signal (or request message) including at least one of a type of the request, a service identifier (e.g., a service name), slot information, a timestamp of the request, a random number, and credential information. The type of the request may include read, write, or delete of data. The read of the data may indicate that the secure data 253a stored in the secure memory 253 is requested. The write of the data may indicate that data is stored in the secure memory 253. The delete of the data may indicate that the secure data 253a stored in the secure memory 253 is delete. The service identifier may include information capable of identifying an owner of the requested secure data 253a. The slot information may include information indicating a location at which the secure data 253a is stored in the secure memory 253. The timestamp of the request may indicate a time at which the secure data 253a is requested. The random number may be associated with information for avoiding retransmission of the same second signal (or request message). For example, the random number may be used to avoid retransmission of the second signal (or request message). The credential information may include data (e.g., the secure data 253a) to be stored in the secure memory 253 when the type of the request is the write of the data. The secure processor 251 which has received the second signal (or request message) may transfer signature information for the second signal (or request message) to the secure processing application 232.

In operation 530, the secure processing application 232 which has received the signature information may send the second signal (or request message) and the signature information to the access control application 257 which operates in the third execution environment 203. Operations of the access control application 257 may be controlled by the secure processor 251.

In operation 540, the access control application 257 which has received the second signal (or request message) may attempt user authentication, based on the state information 259a stored in the third execution environment 203. For example, the access control application 257 may verify the state of the electronic device 200, based on the state information 259a, and may determine whether the user authentication succeeds or fails according to the state of the electronic device 200. For example, when the state of the electronic device 200 is the lock state, the access control application 257 may process the user authentication as a failure. As another example, when the state of the electronic device 200 is the unlock state, the access control application 257 may process the user authentication as a success. Since the secure service application 212 is executed in the state 501 after user authentication in FIG. 5, the state of the electronic device 200 is the unlock state. Therefore, the access control application 257 may process the user authentication as a success.

The secure processor 251 and the secure memory 253 may share an authentication key for message authentication. The authentication key may be used for the purpose of verifying that the message is transmitted.

When the user authentication succeeds, in operation 540, the access control application 257 may verify the valid duration 259b for the access to the secure memory 253.

When the valid duration 259b is not verified, in operation 560, the access control application 257 may send to the secure processing application 232 a third signal (or decline message) which declines the request of the secure data 253a. In operation 570, the secure processing application 232 which has received the third signal (or decline message) declining the request of the secure data 253a may send to the secure service application 212 a fourth signal which notifies that the request for the secure data 253a is declined. The secure service application 212 may output information indicating that the request for the secure data 253a is declined through an interface, in response to the fourth signal. For example, the secure service application 212 may display a visual object indicating that the request for the secure data 253a is declined on a display. As another example, the secure service application 212 may output a voice indicating that the request for the secure data 253a is declined through a speaker.

When the access to the secure memory 253 is valid as the result of verifying the valid duration 259b, in operation 505, the access control application 257 may obtain the secure data 253a stored in the secure memory 253. In addition, in operation 560, the access control application 257 may send to the secure processing application 232 a fifth signal (or response message) including the obtained secure data 253a.

In operation 570, the secure processing application 232 which has received the fifth signal (or response message) including the secure data 253a may send the secure data 253a to the secure service application 212. Thereafter, the secure service application 212 may provide a service by using the secure data 253a.

Figure 6:
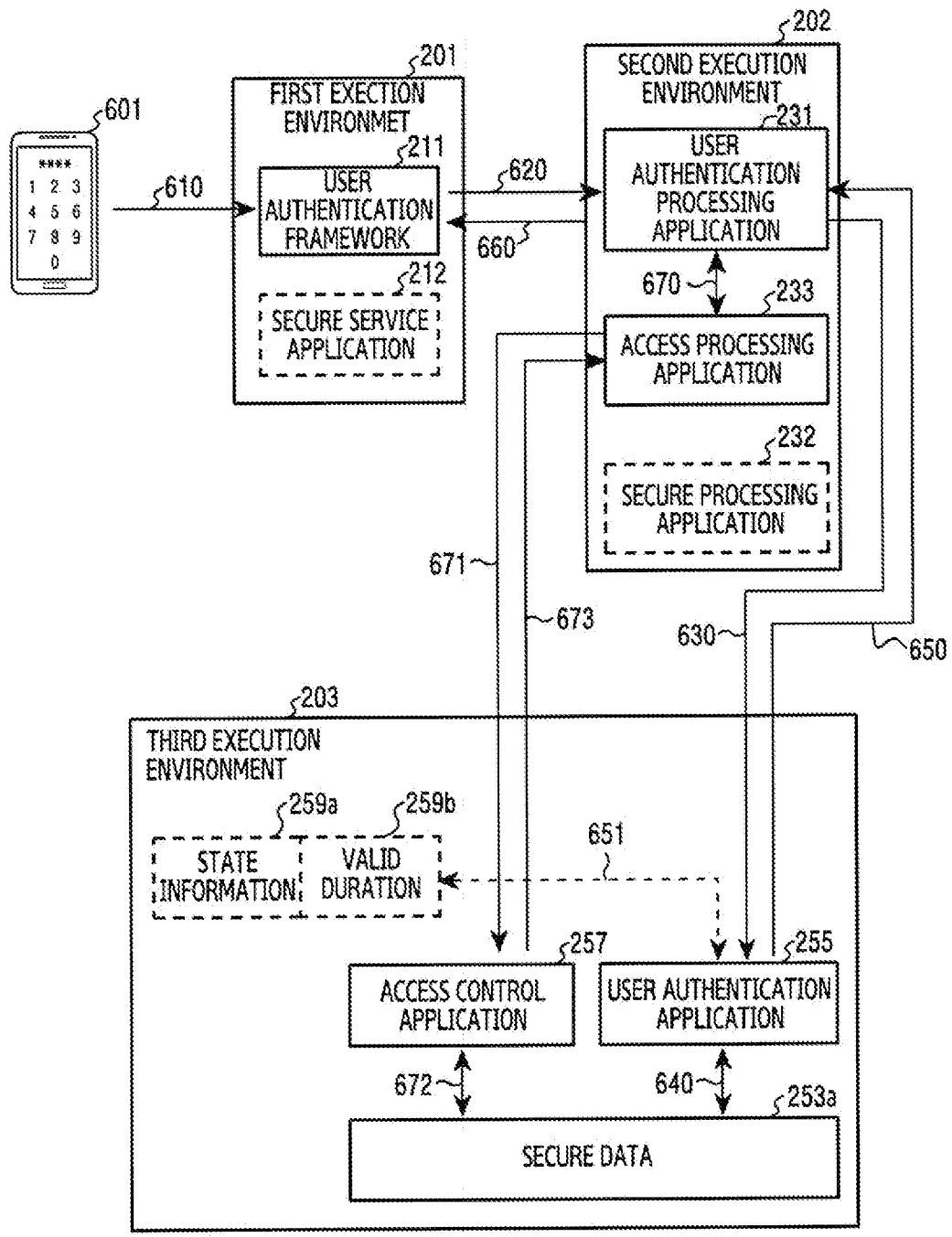
FIG. 6 is a drawing illustrating a method of user authentication through a Trusted Application (TA) according to an embodiment of the disclosure.

FIG. 6 is a drawing illustrating a method of user authentication through a TA according to an embodiment of the disclosure.

Referring to FIG. 6, as shown in operation 610, the electronic device 200 may provide an interface 601 so that information (e.g., a pin number, a pattern, or a password) for user authentication is input through the first execution environment 201. In addition, the user authentication framework 211 may obtain information for the user authentication through the interface 601. For example, the interface 601 may be displayed on a display when the electronic device 200 is booted or in a state where a specified time elapses after user authentication (e.g., a state where a valid duration for an access to the secure memory 253 expires).

When the information for the user authentication is obtained, in operation 620, the user authentication framework 211 may send a first signal including the obtained information to the user authentication processing application 231 which operates in the second execution environment 202. The information for the user authentication may be transferred to the user authentication processing application 231 by being converted (e.g., encrypted) to a secure format. Operations of the user authentication framework 211, user authentication processing application 231, and access processing application 233 may be controlled by the processor 230.

The user authentication processing application 231 may transmit to the secure processor 251 which provides the third execution environment 203 a second signal (or request message) requesting verification of information obtained for the user authentication. The second signal (or request message) may include at least one of a type of the request, a service identifier (e.g., a service name), slot information, a timestamp of the request, a random number, and encrypted user authentication information (e.g., information obtained by encrypting a pin number, a pattern, or a password). The type of the request may include information which requests verification of the user authentication information. The type of the request may include information indicating a type of the user authentication information. The service identifier may include information capable of identifying an owner of the user authentication information which requests the verification. The slot information may include information indicating a location at which pre-stored user authentication information is stored in the secure memory 253. The timestamp of the request may indicate a time at which verification of the user authentication information is requested. The random number may be associated with information for avoiding retransmission of the same second signal (or request message). For example, the random number may be used to avoid retransmission of the second signal (or request message). The secure processor 251 which has received the second signal (or request message) may transfer signature information for the second signal (or request message) to the user authentication processing application 231.

In operation 630, the user authentication processing application 231 which has received the signature information may send the second signal (or request message) and the signature information to the user authentication application 255 which operates in the third execution environment 203.

Operations of the user authentication application 255 and access control application 257 may be controlled by the secure processor 251.

In operation 640, the user authentication application 255 which has received the second signal (or request message) may attempt user authentication by comparing user authentication information (including the secure data 253a) pre-stored in the secure memory 253 and user authentication information received from the user authentication application 231.

When the user authentication succeeds (e.g., when a value indicating similarity between the user authentication information pre-stored in the secure memory 253 and the transferred information is greater than or equal to a specified level), the user authentication application 255 may switch the state of the electronic device 200 to the unlock state. Alternatively, when the user authentication fails (e.g., when the value indicating the similarity between the user authentication information pre-stored in the memory 253 and the transferred information is less than the specified level), the user authentication application 255 may maintain the state of the electronic device 200 to the lock state.

According to an embodiment, as shown in operation 651, the user authentication application 255 may apply the state (e.g., the lock state or the unlock state) of the electronic device 200 to the state information 259a stored in the third execution environment 203. For example, the user authentication application 255 may also store the state information 259a as information indicating the lock state when the state of the electronic device 200 is the lock state, and may also the state information 259a as information indicating the unlock state when the state of the electronic device 200 is the unlock state. In addition, when the user authentication succeeds, the user authentication application 255 may configure the valid duration 259b for an access to the secure memory 253. For example, the user authentication application 255 may store a current time or a time at which verification of the user authentication information is requested in the valid duration 259b. As another example, the user authentication application 255 may set a start time in the valid duration 259b for the access to the secure memory 253 to the current time or the time at which verification of the user authentication information is requested, and may set an end (expiry) time in the valid duration 259b to a time which exceeds by a specified time from the start time.

In operation 650, the user authentication application 255 may send a third signal (or decline message) indicating a result of processing the user authentication to the user authentication processing application 231. In addition, in operation 660, the user authentication processing application 231 which has received the third signal (or result message) indicating the result of processing the user authentication may send a fourth signal including the result of processing the user authentication to the user authentication framework 211. The user authentication framework 211 may output information indicating the result of processing the user authentication through an interface, in response to the fourth signal. For example, the user authentication framework 211 may display a visual object indicating the result of processing the user authentication on the display. As another example, the user authentication framework 211 may output a voice indicating the result of processing the user authentication through a speaker.

In operation 670, the user authentication processing application 231 may send a fifth signal (or authentication result message) including a result of processing the user authentication to the access processing application 233. According to an embodiment, when the user authentication succeeds, the fifth signal may include a token including a valid duration (corresponding to the valid duration 259b stored in the third execution environment 203) for the access to the secure memory 253 and a key value for decoding the secure data 253a stored in the secure memory 253. The access processing application 233 may store the token and the key value in a buffer. Herein, the buffer may be included in the second execution environment 202. The token may include, for example, at least one of a User ID (ID), an authentication time, a valid duration, and signature information.

In operation 671, the access processing application 233 which has received the fifth signal (or authentication result message) including the result of processing the user authentication may send a sixth signal requesting the secure data 253a stored in the secure memory 253 to the access control application 257 which operates in the third execution environment 203. In operation 672, the access control application 257 which has received the sixth signal requesting the secure data 253a may obtain the secure data 253a stored in the secure memory 253. In addition, in operation 673, the access control application 257 may transfer the secure data 253a to the access control application 233. The access processing application 233 which has received the secure data 253a may store the secure data 253a in the buffer. In some embodiments, when the secure data 253a is stored in the buffer, the access processing application 233 may skip the performing of the aforementioned operations 671, 672, and 673.

According to an embodiment, when the valid duration included in the token expires, the access processing application 233 may delete (or initialize) the token and key value stored in the buffer. For example, the access processing application 233 may control the access to the secure data 253a through the valid duration included in the token, and when the valid duration expires, the token is deleted (or initialized) to verify whether the token is present (or whether the token is initialized), thereby rapidly determining validity for the access to the secure data 253a. That is, in a state where the user does not use the electronic device 200 before the user authentication (e.g., a lock state) or a state where a specified time elapses after the user authentication (e.g., a state where the valid duration expires), the access processing application 233 may not send the secure data 253a stored in the buffer to the secure service application 212.

According to an embodiment, after the token and the key value are deleted from the buffer, when information (e.g., a pin number, a pattern, or a password) for the user authentication is obtained through an interface provided by the user authentication framework 211, the access processing application 233 may attempt the user authentication, based on the obtained information. In addition, when the user authentication succeeds, the access processing application 233 may store in the buffer a token including a valid duration reconfigured for the access to the secure memory 253 and a key value for decoding the secure data 253a stored in the buffer. For example, after the secure data 253a is obtained from the secure memory 253 and stored in the buffer, when the token and the key value are deleted due to the expiration of the valid duration, the access processing application 233 may store the key value and the token including the reconfigured valid duration again in the buffer through the user authentication operation. In this case, the access processing application 233 may skip the operation of obtaining the secure data 253a from the secure memory 253.

Figure 7:
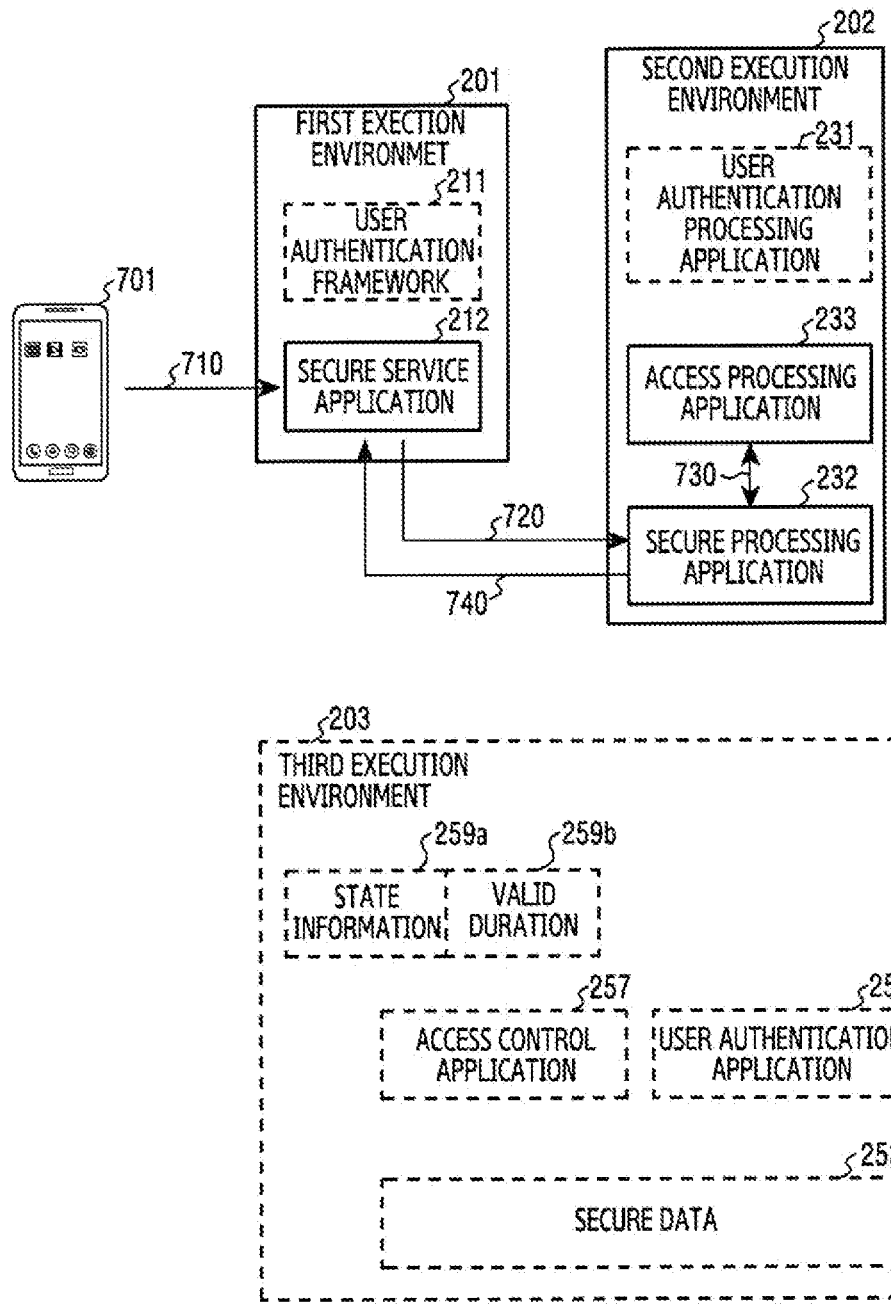
FIG. 7 is a drawing illustrating a method of processing secure data through a TA after user authentication according to an embodiment of the disclosure.

FIG. 7 is a drawing illustrating a method of processing secure data through a TA after user authentication according to an embodiment of the disclosure.

Referring to FIG. 7, as shown in operation 710, in a state 701 after user authentication (e.g., an unlock state), the electronic device 200 may execute the secure service application 212 operating in the first execution environment 201.

In operation 720, the secure service application 212 may send a first signal requesting the secure data 243a to the secure processing application 232 operating in the second execution environment 202. Operations of the secure service application 212, secure processing application 232, and access processing application 233 may be controlled by the processor 230.

In operation 730, the secure processing application 232 may send to the access processing application 233 operating in the second execution environment 202 a second signal (or request message) including at least one of a type of the request, a service identifier (e.g., a service name), slot information, a timestamp of the request, and credential information. The type of the request may include read, write, or delete of data. The read of the data may indicate that the secure data 253a stored in the secure memory 253 is requested. The write of the data may indicate that data is stored in the secure memory 253. The delete of the data may indicate that the secure data 253a stored in the secure memory 253 is delete. The service identifier may include information capable of identifying an owner of the requested secure data 253a. The slot information may include information indicating a location at which the secure data 253a is stored in the secure memory 253 (or a location at which the data is stored in the buffer included in the second execution environment 202). The timestamp of the request may indicate a time at which the secure data 253a is requested. The credential information may include data (e.g., the secure data 253a) to be stored in the secure memory 253 when the type of the request is the write of the data.

The access processing application 233 which has received the second signal (or request message) may verify whether the token stored in the buffer is present. In the absence of the token stored in the buffer, in operation 740, the access processing application 233 may send the third signal (or decline message) declining the request of the secure data 253a to the secure service application 212. Alternatively, in the presence of the token in the buffer, the access processing application 233 may verify a valid duration included in the token. When the valid duration is verified, the access processing application 233 may decode the secure data 253a stored in the buffer by using a key value stored in the buffer. In addition, in operation 740, the access processing application 233 may send the decoded secure data 253a to the secure service application 212.

In a case where at least one of the token, the secure data 253a, and the key value is stored in the buffer included in the second execution environment 202, when the secure service application 212 requests the secure data 253a, the access processing application 233 may send the secure data 253a stored in the buffer to the secure service application 212, based on the valid duration included in the token stored in the buffer, instead of obtaining the secure data 253a from the secure memory 253. Accordingly, advantageously, the electronic device 200 may satisfy a service requirement in which a fast response time is desired even in an environment of a low data transfer rate, without being limited to a hardware specification of the secure memory 253. In addition, since the electronic device 200 stores the secure data 253a in the buffer included in the second execution environment 202, advantageously, an access to the secure data 253a may be controlled at a security level higher than that of the first execution environment 201.

Figure 8:
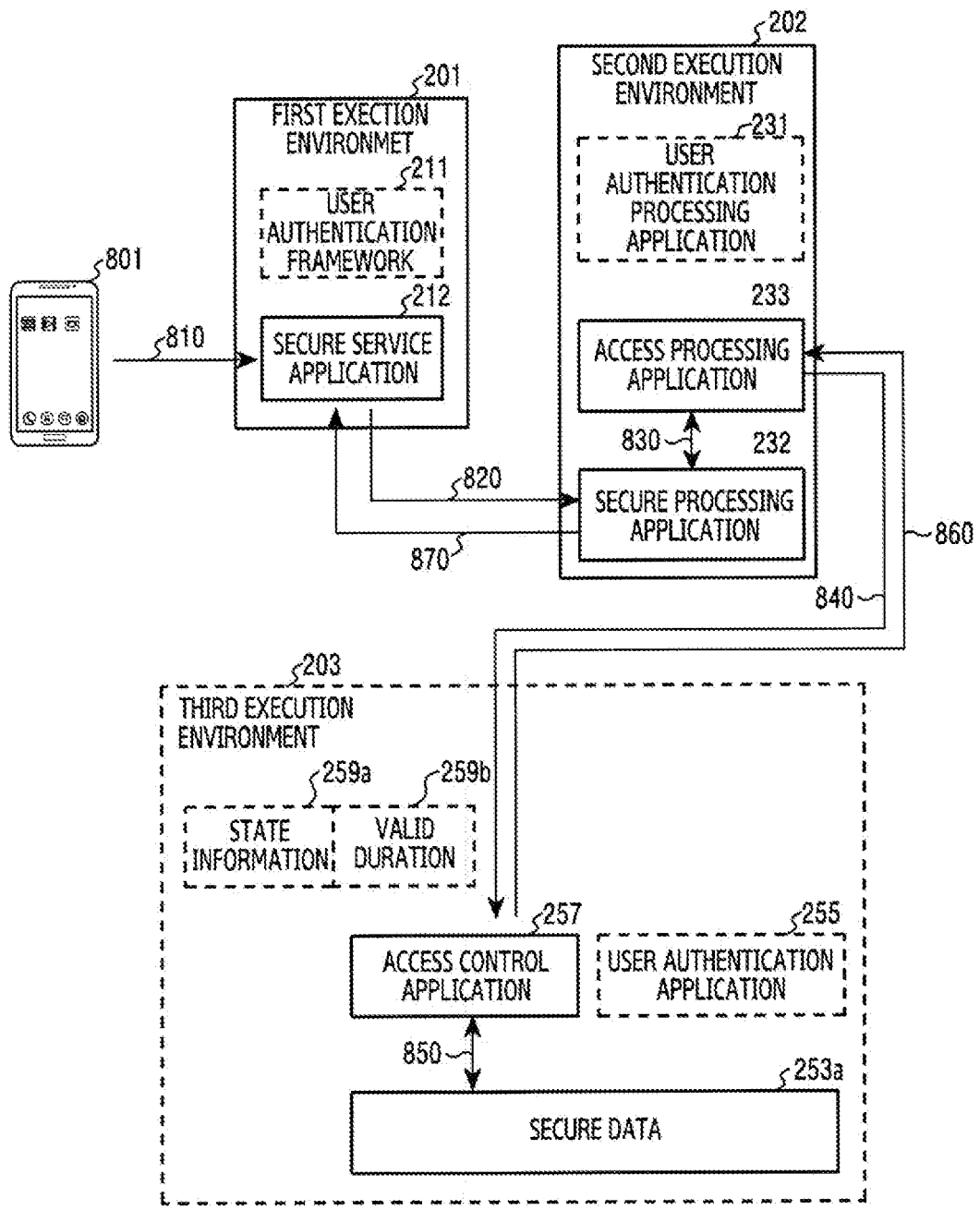
FIG. 8 is a drawing illustrating a method of processing secure data through a TA after user authentication according to an embodiment of the disclosure.

FIG. 8 is a drawing illustrating a method of processing secure data through a TA after user authentication according to an embodiment of the disclosure.

Referring to FIG. 8, as shown in operation 810, in a state 801 after user authentication (e.g., an unlock state), the electronic device 200 may execute the secure service application 212 operating in the first execution environment 201.

In operation 820, the secure service application 212 may send a first signal requesting to store data (e.g., the secure data 253a) in the secure memory 253 to the secure processing application 232 operating in the second execution environment 202. Operations of the secure service application 212, secure processing application 232, and access processing application 233 may be controlled by the processor 230.

In operation 830, the secure processing application 232 may send to the access processing application 233 operating in the second execution environment 202 a second signal (or request message) including at least one of a type of the request, a service identifier (e.g., a service name), slot information, a timestamp of the request, and credential information. The type of the request may include read, write, or delete of data. The read of the data may indicate that the secure data 253a stored in the secure memory 253 is requested. The write of the data may indicate that data is stored in the secure memory 253. The delete of the data may indicate that the secure data 253a stored in the secure memory 253 is delete. The service identifier may include information capable of identifying an owner of the requested secure data 253a. The slot information may include information indicating a location at which the secure data 253a is stored in the secure memory 253 (or a location at which the data is stored in the buffer included in the second execution environment 202). The timestamp of the request may indicate a time at which the secure data 253a is requested. The credential information may include data (e.g., the secure data 253a) to be stored in the secure memory 253 when the type of the request is the write of the data.

The access processing application 233 which has received the second signal (or request message) may verify whether the token stored in the buffer is present. In the absence of the token stored in the buffer, in operation 740, the access processing application 233 may send the third signal (or decline message) declining the request for writing the data to the secure processing application 232. In operation 870, the secure processing application 232 which has received the third signal (or decline message) declining the request for writing the data may send to the secure service application 212 a fourth signal which notifies that the request for writing the data is declined. The secure service application 212 may output information indicating that the request for writing the data is declined through an interface, in response to the fourth signal. For example, the secure service application 212 may display a visual object indicating that the request for writing the data is declined on a display. As another example, the secure service application 212 may output a voice indicating that the request for writing the data is declined through a speaker. In the presence of the token in the buffer, the access processing application 233 may verify a valid duration (corresponding to the valid duration 259b stored in the third execution environment 203) included in the token. When the valid duration is verified, the access processing application 233 may store the data in the buffer.

In operation 840, the access processing application 233 may send to the access control application 257 operating in the third execution environment 203 a fifth signal requesting to store the data, stored in the buffer, in the secure memory 253. In operation 850, the access control application 257 which has received the fifth signal requesting to store the data may store the data in the secure memory 253. In addition, in operation 860, the access control application 257 may send to the access processing application 233 a sixth signal (or result message) indicating a result of processing the storing of the data. The access processing application 233 which has received the sixth signal (or result message) indicating the result of processing the storing of the data may send the result of processing the storing of the data to the secure processing application 232. Thereafter, in operation 870, the secure processing application 232 may send a seventh signal which notifies the result of processing the storing of the data to the secure service application 212. The secure service application 212 may output information including the result of processing the storing of the data through an interface, in response to the seventh signal. For example, the secure service application 212 may display a visual object including the result of processing the storing of the data on a display. As another example, the secure service application 212 may output a voice including the result of processing the storing of the data through a speaker.

Figure 9:
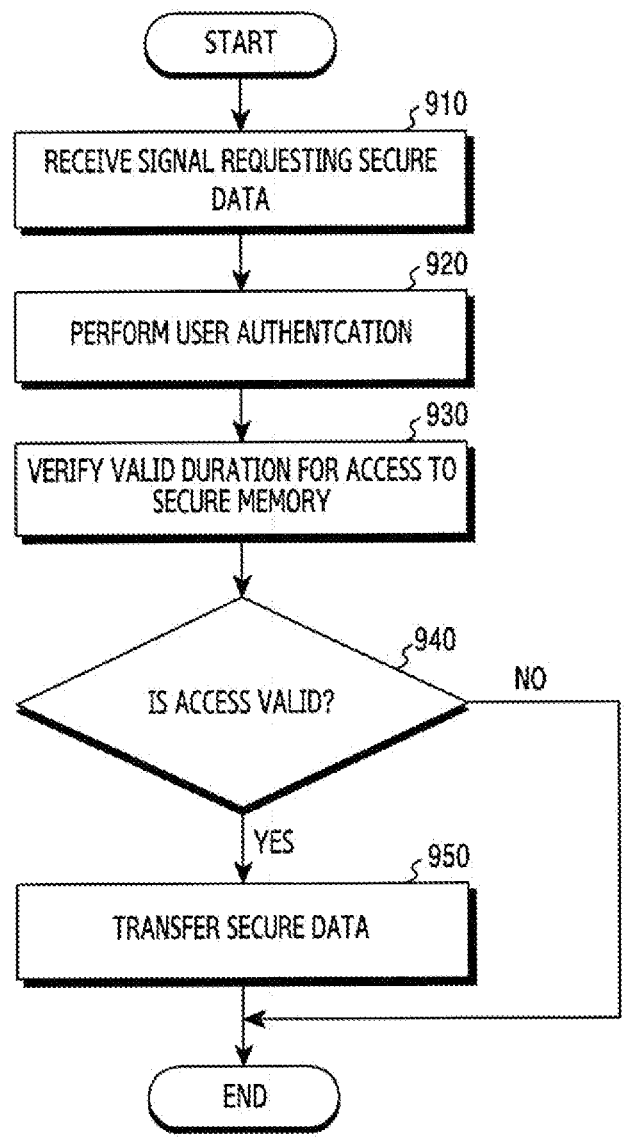
FIG. 9 is a drawing illustrating a method of operating an electronic device related to processing of secure data through an SA according to an embodiment of the disclosure.

FIG. 9 is a drawing illustrating a method of operating an electronic device related to processing of secure data through an SA according to an embodiment of the disclosure.

Referring to FIG. 9, in operation 910, the secure processor 251 of the electronic device 200 may receive a signal (or request message) for requesting the secure data 253a stored in the secure memory 253 from the processor 230 physically separated from the secure processor 251. The signal may include at least one of a type of the request, a service identifier (e.g., a service name), slot information, a timestamp of the request, a random number, and credential information. The type of the request may include read, write, or delete of data. The read of the data may indicate that the secure data 253a stored in the secure memory 253 is requested. The write of the data may indicate that data is stored in the secure memory 253. The delete of the data may indicate that the secure data 253a stored in the secure memory 253 is delete. The service identifier may include information capable of identifying an owner of the requested secure data 253a. The slot information may include information indicating a location at which the secure data 253a is stored in the secure memory 253. The timestamp of the request may indicate a time at which the secure data 253a is requested. The random number may be associated with information for avoiding retransmission of the same second signal (or request message). For example, the random number may be used to avoid retransmission of the second signal (or request message). The credential information may include data (e.g., the secure data 253a) to be stored in the secure memory 253 when the type of the request is the write of the data.

In operation 920, the secure processor 251 may attempt user authentication, in response to reception of the signal. The secure processor 251 may attempt the user authentication, based on the state information 259a of the electronic device 200, stored in the third execution environment 203 provided by the secure processor 251. When the state of the electronic device 200 is the lock state, the secure processor 251 may process the user authentication as a failure, based on the state information 259a. Alternatively, when the state of the electronic device 200 is the unlock state, the secure processor 251 may process the user authentication as a success, based on the state information 259a. According to an embodiment, when the user authentication fails, the secure processor 251 may send a signal indicating a failure of the user authentication to the processor 230, When the user authentication succeeds, in operation 930, the secure processor 251 may verify a valid duration for an access to the secure memory 253. The secure processor 251 may verify the valid duration 259b for the access to the secure memory 253 stored in the third execution environment 203. The valid duration 259b may include information on a time (e.g., a start time and an end (expiry) time) for which the access to the secure memory 253 is allowed. According to an embodiment, a secure timer for verifying the expiration of the valid duration for the access to the secure memory 253 may be included in the third execution environment 203. For example, as a timer which is set from the start time to the end (expiry) time, the secure timer may notify the expiration of the valid duration to the secure processor 251 when it is the end (expiry) time.

In operation 940, the secure processor 251 may determine whether the access to the secure memory 253 is valid, based on the verified valid duration 259b. When the access to the secure memory 253 is not valid as the result of verifying the valid duration, the secure processor 251 may send a signal declining the request of the secure data 253a to the processor 230. When the access to the secure memory 253 is valid as the result of verifying the valid duration, in operation 950, the secure processor 251 may transfer the secure data 253a stored in the secure memory 253 to the processor 230.

Figure 10:
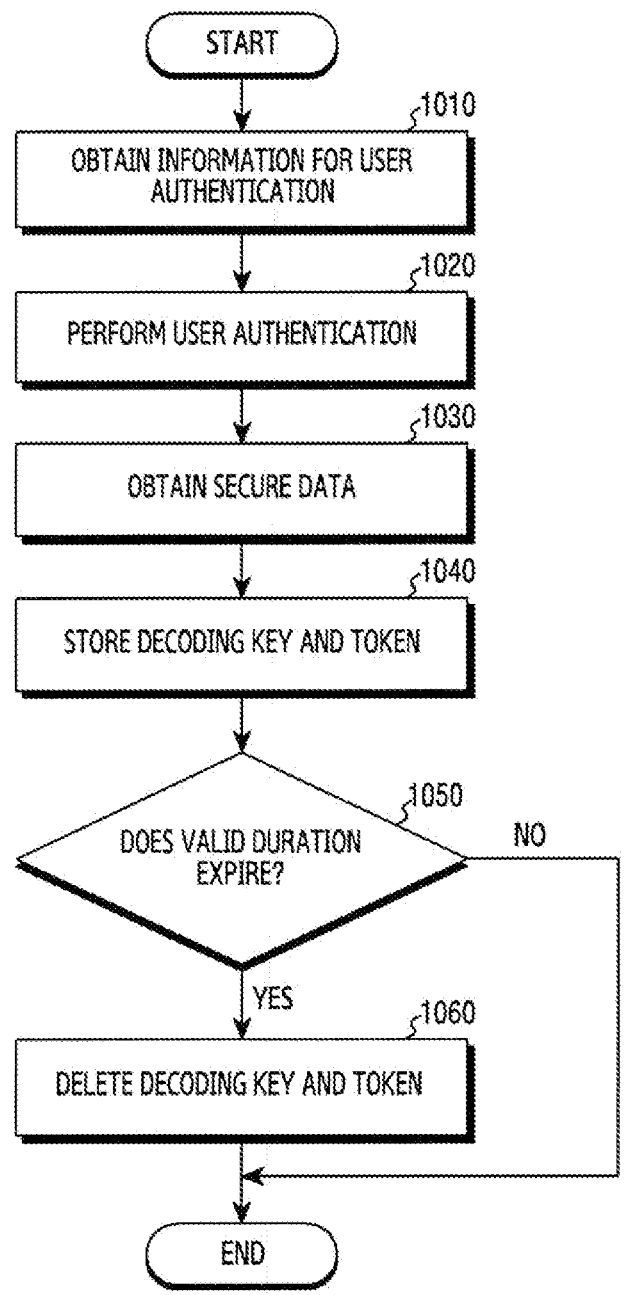
FIG. 10 is a drawing illustrating a method of operating an electronic device related to processing of secure data through a TA according to an embodiment of the disclosure.

FIG. 10 is a drawing illustrating a method of operating an electronic device related to processing of secure data through a TA according to an embodiment of the disclosure.

Referring to FIG. 10, in operation 1010, the processor 230 of the electronic device 200 may obtain user authentication information through an interface provided by the user authentication framework 211. For example, when the user inputs a pin number, a pattern, or a password through the interface, the processor 230 may obtain information (e.g., the pin number, the pattern, or the password) input from the user authentication framework 211. In addition, in operation 1020, the processor 230 may attempt the user authentication, based on the obtained information (e.g., the pin number, the pattern, or the password).

According to an embodiment, when the user authentication fails, the processor 230 may output information for notifying that the user authentication has failed, through an interface provided by the user authentication framework 211. For example, the processor 230 may display an object indicating the failure of the user authentication on the display.

When the user authentication succeeds, in operation 1030, the processor 230 may obtain the secure data 253a from the secure memory 253 included in the secure module 250 physically separated from the processor 230. In addition, when the user authentication succeeds, the processor 230 may obtain a token including a valid duration for an access to the secure memory 253 and a key value for decoding the secure data 253a. For example, the token may include at least one of a User Identifier (UID), an authentication time, a valid duration, and signature information.

In operation 1040, the processor 230 may store the token and the key value in the buffer. In addition, the processor 230 may store the obtained secure data 253a in the buffer. For example, the processor 230 may store at least one of the token, the key value, and the obtained secure data 253a in the buffer. Herein, the buffer may be included in the second execution environment 202 provided by the processor 230. The processor 230 may store at least one of the token, the obtained secure data 253a, and the key value through the TA 230a (e.g., the access processing application 233) operating in the second execution environment 202.

In operation 1050, the processor 230 may determine whether the valid duration included in the token expires. When the valid duration does not expire, the processor 230 may not delete (or initialize) the token and key value stored in the buffer. When the valid duration expires, in operation 1060, the processor 230 may delete (or initialize) the token and key value stored in the buffer. For example, the processor 230 may control the access to the secure data 253a through the valid duration included in the token. In this case, when the valid duration expires, the token may be deleted (or initialized), so that validity for the access to the secure data 253 is determined rapidly by verifying only whether the token is present (or whether it is initialized). That is, in a state where the user does not use the electronic device 200 before the user authentication (e.g., a lock state) or a state where a specified time elapses after the user authentication (e.g., a state where the valid duration expires), the processor 230 may not transfer the secure data 253a stored in the buffer to the secure service application 212.

In a case where at least one of the token, the secure data 253a, and the key value is stored in the buffer included in the second execution environment 202, when the secure service application 212 requests the secure data 253a, the processor 230 may transfer the secure data 253a stored in the buffer to the secure service application 212, based on the valid duration included in the token stored in the buffer, instead of obtaining the secure data 253a from the secure memory 253. Accordingly, advantageously, the electronic device 200 may satisfy a service requirement in which a fast response time is desired even in an environment of a low data transfer rate, without being limited to a hardware specification of the secure memory 253. In addition, since the electronic device 200 stores the secure data 253a in the buffer included in the second execution environment 202, advantageously, an access to the secure data 253a may be controlled at a security level higher than that of the first execution environment 201.

According to an embodiment, after the token and the key value are deleted from the buffer, the processor 230 may attempt the user authentication, based on the obtained information, when information (e.g., a pin number, a pattern, or a password) for the user authentication is obtained through the interface. In addition, when the user authentication succeeds, a token including a valid duration reconfigured for an access to the secure memory 253 and a key value for decoding the secure data 253a stored in the buffer may be stored in the buffer. For example, after the secure data 253a is obtained from the secure memory 253 and is stored in the buffer, when the token and the key value are deleted at the expiry of the valid duration the processor 230, the processor 230 may store the token including the key value and the reconfigured valid duration again in the buffer. In this case, the processor 230 may skip the operation of obtaining the secure data 253a from the secure memory 253.

As described above, according to an embodiment, a method of processing secure data of an electronic device (e.g., the electronic device 200) may include an operation (e.g., the operation 1010) of obtaining user authentication information, an operation (e.g., the operation 1020) of attempting the user authentication, based on the user authentication information, an operation (e.g., the operation 1030) of obtaining the secure data (e.g., the secure data 253a) from a secure memory (e.g., the secure memory 253) included in a secure module (e.g., the secure module 250) physically separated from a processor (e.g., the processor 230) of the electronic device, when the user authentication succeeds, an operation (e.g., the operation 1040) of storing a first token including a first valid duration for an access to the secure memory, the obtained secure data, and a first key value for decoding the obtained secure data in a buffer, and an operation (e.g., the operation 1060) of deleting the first token and the first key value from the buffer when the first valid duration expires.

According to certain embodiments, the method of processing the secure data may further include verifying whether the first token is present in the buffer, upon receiving a signal requesting the secure data, and sending a signal declining the request for the secure data to the application when the first token is absent in the buffer.

According to certain embodiments, the method of processing the secure data may further include verifying the first valid duration included in the first token when the first token is present in the buffer, decoding the secure data stored in the buffer by using the first key value, when the first valid duration is verified, and transferring the decoded secure data to the application.

According to certain embodiments, the method of processing the secure data may further include, after the first token and the first key value are deleted from the buffer, obtaining user authentication information, attempting user authentication, based on the obtained user authentication information, and storing a second token including a second valid duration for an access to the secure memory and a second key value for decoding the secure data in the buffer, when the user authentication succeeds.

According to certain embodiments, the method of processing the secure data may further include verifying whether the first token is present in the buffer upon receiving from the application a signal requesting to write data in the secure memory, and sending to the application a signal declining to store the data, when the first token is absent in the buffer.

According to certain embodiments, the method of processing the secure data may further include verifying the first valid duration included in the first token, when the first token is present in the buffer, writing the data in the buffer, when the first valid duration is verified, and writing in the secure memory the data stored in the buffer.

According to certain embodiments, the buffer may be included in a Trusted Execution Environment (TEE) (e.g., the second execution environment 202) of a first security level provided by the processor. The secure memory may be included in a Secure Execution Environment (SEE) (e.g., the third execution environment 203) of a second security level higher than the first security level provided by the secure processor.

According to certain embodiments, the storing of the first token, the obtained secure data, and the first key value in the buffer may be performed through a Trusted Application (TA) (e.g., the TA 230a) operating in the TEE.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, The module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a memory storing instructions;
   a processor; and
   a secure module physically separated from the processor and including a secure processor and a secure memory,
   wherein the execution of the instructions by the processor causes the electronic device to:
   obtain user authentication information, through an interface of a user authentication framework operating in a first execution environment, wherein the first execution environment is provided by the processor;
   based on the user authentication information, attempt user authentication, through a trusted application operating in a second execution environment, wherein the second execution environment is provided by the processor;
   when the user authentication succeeds, obtain data from the secure memory through a secure application operating in a third execution environment based on a request sent from the trusted application to the secure application, wherein the third execution environment is provided by the secure processor;
   encrypt the obtained data from the secure memory according to a first key value;
   store a first token including a first valid duration for an access to the secure memory, the encrypted obtained data, and the first key value for decrypting the encrypted data in a buffer included in the second execution environment; and
   delete the first token and the first key value from the buffer when the first valid duration expires,
   wherein a first secure level of the second execution environment is higher than a normal secure level of the first execution environment and lower than a second level of the third execution environment.

2. The electronic device of claim 1, wherein the processor is configured to:
   verify whether the first token is present in the buffer, upon receiving the request for the data stored in the secure memory from the trusted application; and send a signal declining the request for the data to the trusted application when the buffer does not store the first token.

3. The electronic device of claim 2, wherein the processor is configured to:
verify the first valid duration included in the first token when the first token is present in the buffer;
decrypt the encrypted obtained data stored in the buffer by using the first key value, when the first valid duration is verified; and
transfer the decrypted data to the trusted application.

4. The electronic device of claim 1, wherein the processor is configured to:
after the first token and the first key value are deleted from the buffer, obtain user authentication information through the interface;
attempt user authentication, based on the obtained user authentication information; and
store a second token including a second valid duration for an access to the secure memory and a second key value for decrypting the encrypted obtained data in the buffer, when the attempted user authentication succeeds.

5. The electronic device of claim 1, wherein the processor is configured to:
verify whether the first token is present in the buffer upon receiving a signal requesting to write data to the secure memory from the trusted application; and
send a signal declining writing the data to the trusted application, when the first token is absent in the buffer.

6. The electronic device of claim 5, wherein the processor is configured to:
verify the first valid duration included in the first token, when the first token is present in the buffer;
store the data in the buffer, when the first valid duration is verified; and
write the data stored in the buffer to the secure memory.

7. An electronic device comprising:
a memory storing an application;
a processor; and
a secure module physically separated from the processor and including a secure memory and a secure processor,
wherein the processor is configured to:
receive a signal requesting data stored in the secure memory;
attempt user authentication, in response to receiving of the signal in a first execution environment provided by the processor;
based on user authentication information. attempt user authentication through a trusted application operating in a second execution environment provided by the processor;
when the user authentication succeeds, verify a valid duration for an access to the secure memory and obtain data from the secure memory through a secure application operating in a third execution environment based on a request sent from the trusted application to the secure application. wherein the third execution environment is provided by the secure processor;
send a signal declining a request for the data to the processor when the valid duration is not verified; and
send the data stored in a buffer when the valid duration is verified, wherein the data stored in the buffer is encrypted and sending the data comprises decrypting the data,
wherein a first secure level of the second execution environment is higher than a normal secure level of the first execution environment and lower than a second level of the third execution environment.

8. A method of processing secure data of an electronic device, the method comprising:
obtaining user authentication information, through an interface of a user authentication framework operating in a first execution environment, wherein the first execution environment is provided by a processor;
based on the user authentication information, attempt user authentication, through a trusted application operating in a second execution environment, wherein the second execution environment is provided by the processor;
when the user authentication succeeds, obtaining the secure data from a secure memory included in a secure module physically separated from a processor of the electronic device, through a secure application operating in a third execution environment based on a request sent from the trusted application to the secure application, wherein the third execution environment is provided by a secure processor;
encrypting the secure data obtained form the secure memory according to a first key value;
storing a first token including a first valid duration for an access to the secure memory, the encrypted secure data, and the first key value for decrypting the encrypted secure data in a buffer included in the second execution environment; and
deleting the first token and the first key value from the buffer when the first valid duration expires,
wherein a first secure level of the second execution environment is higher than a normal secure level of the first execution environment and lower than a second level of the third execution environment.

9. The method of claim 8, further comprising:
verifying whether the first token is present in the buffer, upon receiving a signal requesting the secure data from an application; and
sending a signal declining the request for the secure data to the application when the first token is absent in the buffer.

10. The method of claim 9, further comprising:
verifying the first valid duration included in the first token when the first token is present in the buffer;
decrypting the secure data stored in the buffer by using the first key value, when the first valid duration is verified; and
transferring the decrypted secure data to the application.

11. The method of claim 8, further comprising:
after the first token and the first key value are deleted from the buffer, obtaining user authentication information;
attempting user authentication, based on the obtained user authentication information; and
storing a second token including a second valid duration for an access to the secure memory and a second key value for decrypting the secure data in the buffer, when the user authentication succeeds.

12. The method of claim 8, further comprising:
verifying whether the first token is present in the buffer upon receiving from an application a signal requesting to write data in the secure memory; and
sending to the application a signal declining to write the data, when the first token is absent in the buffer.

13. The method of claim 12, further comprising:
verifying the first valid duration included in the first token, when the first token is present in the buffer;

writing the data in the buffer, when the first valid duration is verified; and writing the data stored in the buffer to the secure memory.

14. The electronic device of claim 1, wherein the secure application is at least one of a user authentication application and an access control application.

15. The electronic device of claim 1, wherein the trusted application processes the obtained data from the secure application.

* * * * *